US011243930B2

(12) United States Patent
Harel et al.

(10) Patent No.: US 11,243,930 B2
(45) Date of Patent: Feb. 8, 2022

(54) SYSTEM AND METHOD FOR SCALABLE AND SPACE EFFICIENT HARDENING OF A FIXED SIZED HASH TABLE OVER AN UNRELIABLE TIER

(71) Applicant: EMC IP Holding Company, LLC, Hopkinton, MA (US)

(72) Inventors: Bar Harel, Tel Aviv (IL); Uri Shabi, Tel Mond (IL); Maor Rahamim, Ramia (IL)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 150 days.

(21) Appl. No.: 16/527,468

(22) Filed: Jul. 31, 2019

(65) Prior Publication Data
US 2021/0034593 A1    Feb. 4, 2021

(51) Int. Cl.
*G06F 16/22*    (2019.01)
*G06F 16/23*    (2019.01)

(52) U.S. Cl.
CPC ...... *G06F 16/2255* (2019.01); *G06F 16/2379* (2019.01)

(58) Field of Classification Search
CPC .............. G06F 16/2255; G06F 16/2379
See application file for complete search history.

(56) References Cited

U.S. PATENT DOCUMENTS

| 6,122,754 A * | 9/2000 | Litwin ............ G06F 11/1076 711/114 |
| 9,798,756 B2 * | 10/2017 | Kim ............... G06F 16/2255 |
| 10,776,441 B1 * | 9/2020 | Echeverria ........ H04L 67/36 |
| 2016/0147569 A1 * | 5/2016 | Cowling ............ G06F 16/22 718/104 |
| 2017/0192864 A1 * | 7/2017 | Taylor ............. G06F 11/14 |
| 2018/0011852 A1 * | 1/2018 | Bennett ........... G06F 16/2272 |

* cited by examiner

*Primary Examiner* — Robert W Beausoliel, Jr.
*Assistant Examiner* — Mohammad Solaiman Bhuyan
(74) *Attorney, Agent, or Firm* — Brian J. Colandreo; Mark H. Whittenberger; Holland & Knight LLP (57) ABSTRACT

A method, computer program product, and computer system for storing data in a bucket of a plurality of buckets. A spare bucket may be reserved in the plurality of buckets. A copy of the data may be stored in the spare bucket. A pointer to the data in the bucket and a pointer to the copy of the data in the spare bucket may be updated based upon, at least in part, storing the data in the bucket and storing the copy of the data in the spare bucket.

18 Claims, 4 Drawing Sheets

SYSTEM AND METHOD FOR SCALABLE AND SPACE EFFICIENT HARDENING OF A FIXED SIZED HASH TABLE OVER AN UNRELIABLE TIER

BACKGROUND

Some storage systems may need to harden data structures into non-volatile memory block devices (e.g., HHD and SSD). Generally, storage systems for a simple read-modify-write operation are non-atomic. A reason common in storage systems for a simple read-modify-write operation to be non-atomic is RAID over multiple disks (each device may only provide atomicity in its own native block size). However, generally, the read-modify-write operation must be atomic to guarantee consistency in failure condition. This issue is traditionally solved by excessive journal implementations.

BRIEF SUMMARY OF DISCLOSURE

In one example implementation, a method, performed by one or more computing devices, may include but is not limited to storing data in a bucket of a plurality of buckets. A spare bucket may be reserved in the plurality of buckets. A copy of the data may be stored in the spare bucket. A pointer to the data in the bucket and a pointer to the copy of the data in the spare bucket may be updated based upon, at least in part, storing the data in the bucket and storing the copy of the data in the spare bucket.

One or more of the following example features may be included. The spare bucket may be a next slot from the bucket. Updating the pointer to the copy of the data in the spare bucket may include pointing to the bucket storing the data. The plurality of buckets may be updated in a consecutive-cyclic manner. The plurality of buckets may be divided between a fixed number of domains. Each domain of the fixed number of domains may be an instance of an independent logical tier. Each domain of the fixed number of domains may include its own header and spare metadata member.

In another example implementation, a computing system may include one or more processors and one or more memories configured to perform operations that may include but are not limited to storing data in a bucket of a plurality of buckets. A spare bucket may be reserved in the plurality of buckets. A copy of the data may be stored in the spare bucket. A pointer to the data in the bucket and a pointer to the copy of the data in the spare bucket may be updated based upon, at least in part, storing the data in the bucket and storing the copy of the data in the spare bucket.

One or more of the following example features may be included. The spare bucket may be a next slot from the bucket. Updating the pointer to the copy of the data in the spare bucket may include pointing to the bucket storing the data. The plurality of buckets may be updated in a consecutive-cyclic manner. The plurality of buckets may be divided between a fixed number of domains. Each domain of the fixed number of domains may be an instance of an independent logical tier. Each domain of the fixed number of domains may include its own header and spare metadata member.

In another example implementation, a computer program product may reside on a computer readable storage medium having a plurality of instructions stored thereon which, when executed across one or more processors, may cause at least a portion of the one or more processors to perform operations that may include but are not limited to storing data in a bucket of a plurality of buckets. A spare bucket may be reserved in the plurality of buckets. A copy of the data may be stored in the spare bucket. A pointer to the data in the bucket and a pointer to the copy of the data in the spare bucket may be updated based upon, at least in part, storing the data in the bucket and storing the copy of the data in the spare bucket.

One or more of the following example features may be included. The spare bucket may be a next slot from the bucket. Updating the pointer to the copy of the data in the spare bucket may include pointing to the bucket storing the data. The plurality of buckets may be updated in a consecutive-cyclic manner. The plurality of buckets may be divided between a fixed number of domains. Each domain of the fixed number of domains may be an instance of an independent logical tier. Each domain of the fixed number of domains may include its own header and spare metadata member.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
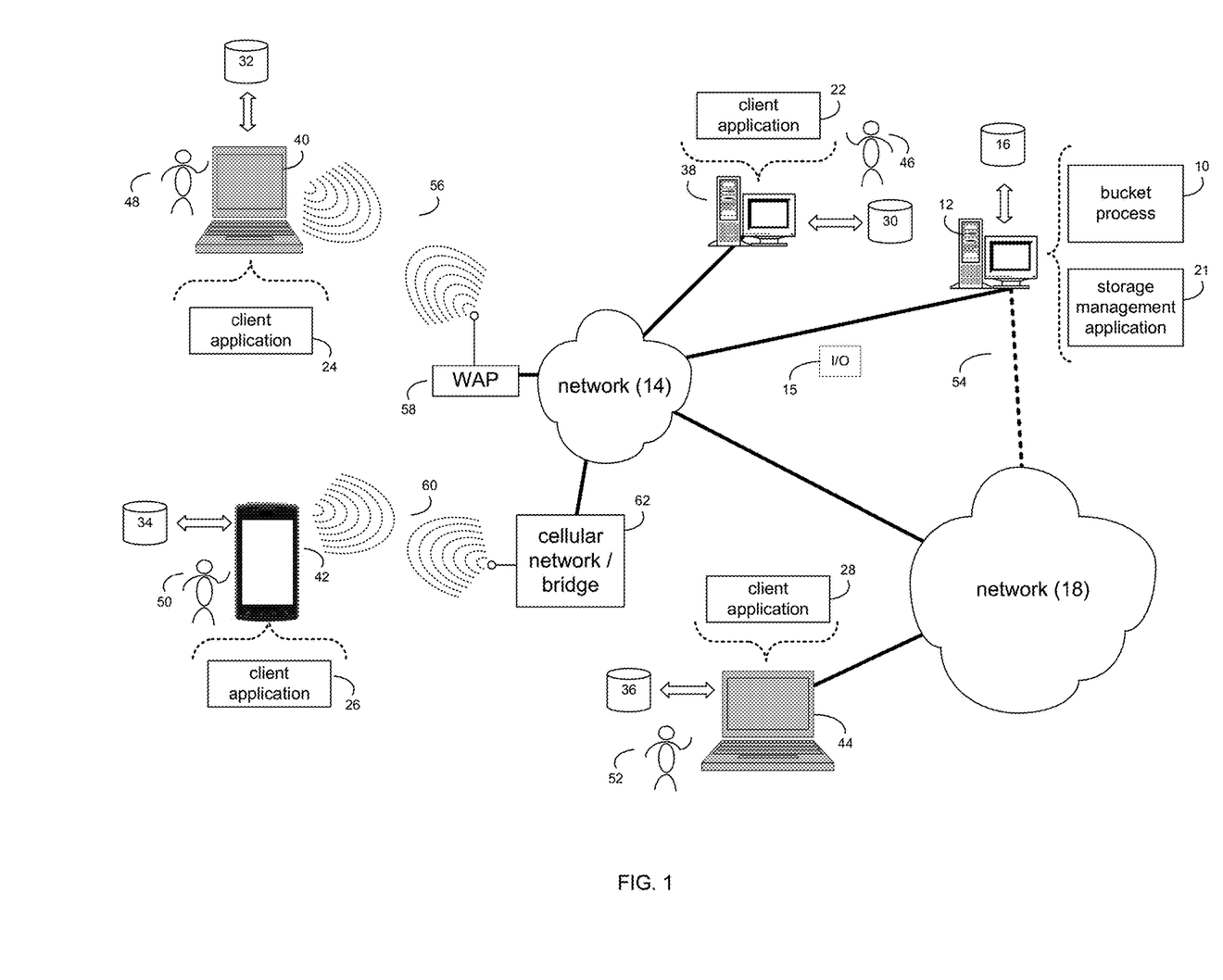
FIG. 1 is an example diagrammatic view of a bucket process coupled to an example distributed computing network according to one or more example implementations of the disclosure.

Referring now to the example implementation of FIG. 1, there is shown bucket process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a bucket process, such as bucket process 10 of FIG. 1, may store data in a bucket of a plurality of buckets. A spare bucket may be reserved in the plurality of buckets. A copy of the data may be stored in the spare bucket. A pointer to the data in the bucket and a pointer to the copy of the data in the spare bucket may be updated based upon, at least in part, storing the data in the bucket and storing the copy of the data in the spare bucket.

In some implementations, the instruction sets and subroutines of bucket process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, bucket process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, bucket process 10 and/or storage management application 21 may be accessed via one or more of client applications 22, 24, 26, 28. In some implementations, bucket process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within bucket process 10, a component of bucket process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of bucket process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of bucket process 10 (and vice versa). Accordingly, in some implementations, bucket process 10 may be a purely server-side application, a purely client-side application, or a hybrid server-side/client-side application that is cooperatively executed by one or more of client applications 22, 24, 26, 28 and/or bucket process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, bucket process 10, and storage management application 21, taken singly or in any combination, may effectuate some or all of the same functionality, any description of effectuating such functionality via one or more of client applications 22, 24, 26, 28, bucket process 10, storage management application 21, or combination thereof, and any described interaction(s) between one or more of client applications 22, 24, 26, 28, bucket process 10, storage management application 21, or combination thereof to effectuate such functionality, should be taken as an example only and not to limit the scope of the disclosure.

In some implementations, one or more of users 46, 48, 50, 52 may access computer 12 and bucket process 10 (e.g., using one or more of client electronic devices 38, 40, 42, 44) directly through network 14 or through secondary network 18. Further, computer 12 may be connected to network 14 through secondary network 18, as illustrated with phantom link line 54. Bucket process 10 may include one or more user interfaces, such as browsers and textual or graphical user interfaces, through which users 46, 48, 50, 52 may access bucket process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Data Storage System

Figure 2:
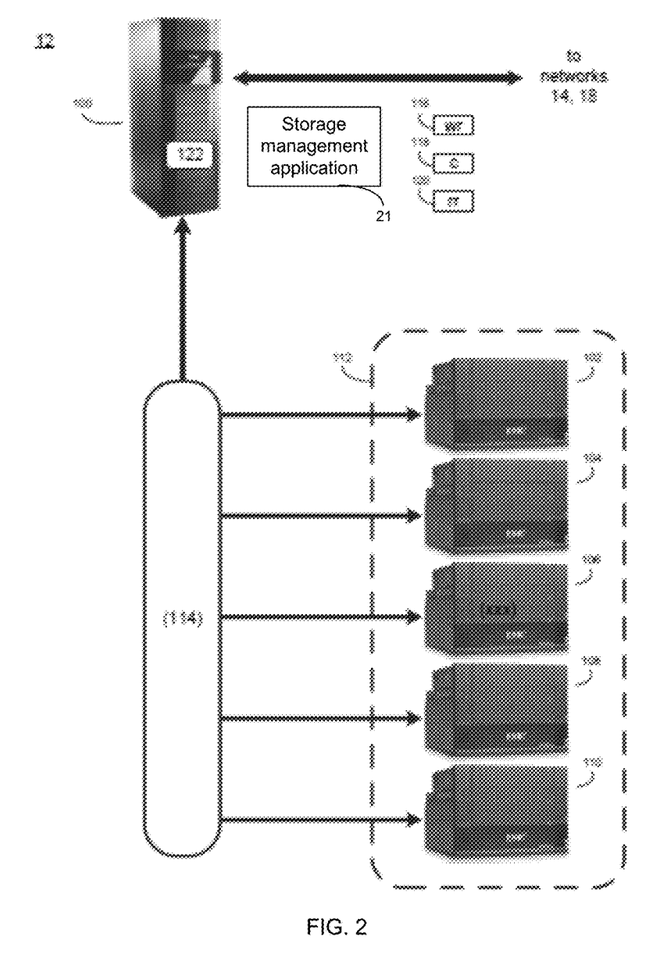
FIG. 2 is an example diagrammatic view of a storage system of FIG. 1 according to one or more example implementations of the disclosure.
Figure 3:
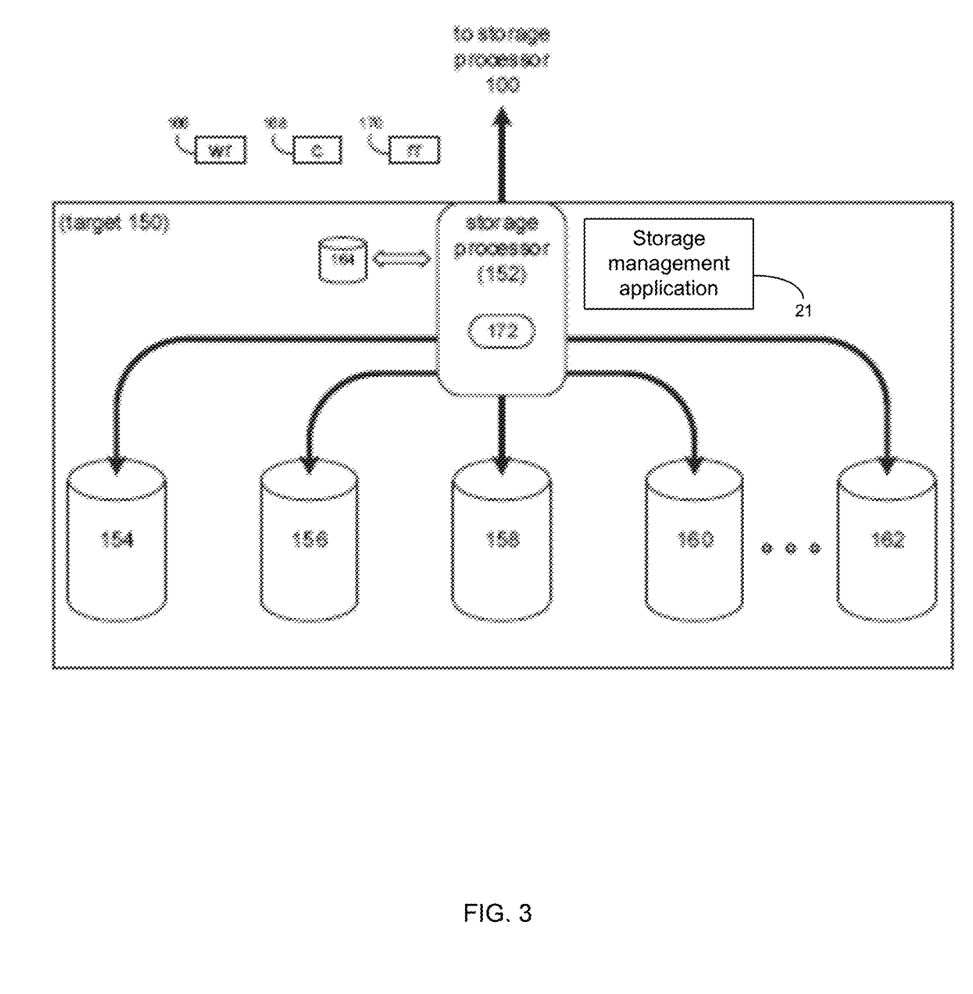
FIG. 3 is an example diagrammatic view of a storage target of FIG. 1 according to one or more example implementations of the disclosure.

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniB and network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or bucket process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VNX™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

A hash table is generally a data structure which implements an associative array abstract data type, a structure that may map keys to values. It uses a hash function to compute from a given key an index into an array of buckets, from which the desired value may be found. A basic requirement is that the hash function should provide a uniform distribution of hash values over the table size. We consider hash collisions resolution (where the hash function generates the same index for more than one key) by chaining entries with the same bucket. A fixed size hash table is a table with fixed number of bucket (N), each one of a fixed maximal number of entries (M). Example: hash table with 1,000,000 buckets, each one with maximal 256 entries rounded to the closest native block size, e.g., 4 KB.

Hardening a fixed size hash table includes saving this data structure into non-volatile memory with a read-modify-write update operation. Assume the system is hardening the hash table into a dedicated logical address space over persistent media (named as "tier"), i.e.:

Bucket #0 resides at logical offset 0,
bucket #1 resides at offset bucket_size, . . . ,
bucket #i resides at offset bucket_size*(i−1)
bucket_size:=4 KB (as in the example).

The above does not guarantee write operation atomicity, i.e.: if during write operation the system restarts or powers off, the logical block written to the tier might end with inconsistent data. Such unreliable tier is common in storage systems where the logical blocks written over a complex and non-native device media type, e.g.: RAID over multiple disks or logical block that is larger than the device native block size. Due to this kind of issue, to guarantee consistent data while working with such tier, one must assure atomicity by its applicative logic. In-place lockless updates of a bucket over an unreliable tier may result with inconsistent data as the read-modify write operation atomicity is not guaranteed. In general, many storage systems solve this issue by excessive transactional journal implementations, which may result in an additional write overhead of the data to be updated, that will be used only upon failure.

Thus, as will be discussed below, the present disclosure may enable updates to a fixed size hash table in a read-modify-write fashion which is lockless and highly scalable, while efficient in terms of metadata representation and CPU. The present disclosure may include an applicative algorithm of assuring read-modify-write atomicity during hardening a fixed size hash table, and may include a space-efficient mapping kept in non-volatile memory, as well as an extra slot in non-volatile memory, which together will consist of the transaction needed for creating an atomic read-modify-write operation. Unlike other storage systems, as it is a lockless and totally independent implementation, the system may be easily scaled and enable multiple simultaneous updates.

The Bucket Process

Figure 4:
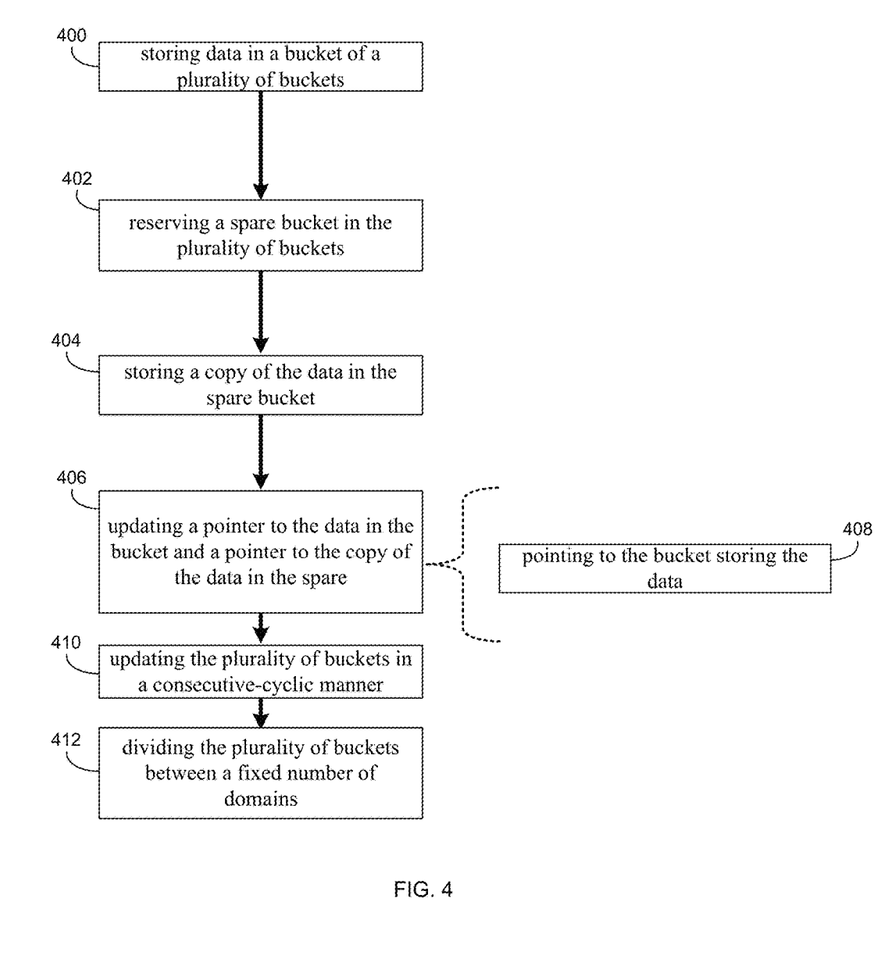
FIG. 4 is an example flowchart of a bucket process according to one or more example implementations of the disclosure.

As discussed above and referring also at least to the example implementations of FIG. 4, bucket process 10 may store 400 data in a bucket of a plurality of buckets. Bucket process 10 may reserve 402 a spare bucket in the plurality of buckets. Bucket process 10 may store 404 a copy of the data in the spare bucket. Bucket process 10 may update 406 a pointer to the data in the bucket and a pointer to the copy of the data in the spare bucket based upon, at least in part, storing the data in the bucket and storing the copy of the data in the spare bucket.

In some implementations, bucket process 10 may store 400 data in a bucket of a plurality of buckets. For example, the logical tier may be in the following structure:

Size:=(#bucket*bucket_size)+1 ("spare")

In some implementations, buckets may be stored in a cyclic and consecutive manner over the n+1 slots.

In some implementations, bucket process 10 may reserve 402 a spare bucket in the plurality of buckets, and the spare bucket may be a next slot from the bucket. For example, along with the n buckets, bucket process 10 may reserve 402 one slot as a spare_bucket, which represents the next slot to be written. In the example, the system does not assume anything regarding data in the spare slot (and therefore does not ever read it).

Non-limiting examples of a valid 5 buckets layout during system duration is as follows:
[bucket_3][bucket_4][spare_bucket][bucket_0][bucket_1][bucket_2]
[bucket_0][bucket_1][bucket_2][spare_bucket][bucket_3][bucket_4]

In some implementations, bucket process 10 may use two metadata fields (e.g., pointers) as follows:
Head—states the index in which bucket_0 is located.
Spare—states the index in which spare_bucket is located.

In some implementations, these fields will be kept in non-volatile memory. Since head states the index of the first bucket, and the spare states the next slot to be written (and does not present data which is necessarily valid), as well as the fact that buckets are stored in a consecutive manner, reading bucket i is performed by skipping i slots from the slot stated by head in a cyclic manner and skipping another slot if the slot stated by spare was reached at any point (also in a cyclic manner).

Non-limiting examples of reading are as follows:
Reading bucket_3:
[A][B][C][D][E][F]
Head=3
Spare=2
From the metadata fields, the following is revealed:
[A][B][spare_bucket][bucket_0][E][F]
Bucket 3 is locates is at slot 0 (A).
Reading bucket 3:
[A][B][C][D][E][F]
Head=4
Spare=1
From the metadata fields, the following is revealed:
[A][spare_bucket][C][D][bucket_0][F]
Bucket_3 is locates at slot 2 (C).

In some implementations, bucket process 10 may store 404 a copy of the data in the spare bucket, and may update 406 a pointer to the data in the bucket and a pointer to the copy of the data in the spare bucket based upon, at least in part, storing the data in the bucket and storing the copy of the data in the spare bucket, where updating the pointer to the copy of the data in the spare bucket may include pointing 408 to the bucket storing the data. For example, updating bucket i may be performed as follows:
Read bucket i from slot s in tier
Modify bucket
Write (store) bucket i into spare_bucket location
If i==0: Update head to be spare.
Update spare location to be s (previous bucket i location)
The "update head to be spare" and "update spare location to be s" must be performed atomically.

Example of several bucket updates are as follows:
Original state:
  [bkt_3][bkt_4][spare_bkt][bkt_0][bkt_1][bkt_2]
  Head=3
  Spare=2
Update bucket_0:
  [bkt_3][bkt_4][updated_bkt_0][spare][bkt_1][bkt_2]
  Head=2
  Spare=3
Update bucket_1:
  [bkt_3][bkt_4][updated_bkt_0][updated_bkt_1][spare][bkt_2]
  Head=2
  Spare=4

Performing the read-modify write operation in this manner guarantees atomicity, since bucket process 10 never writes bucket in-place, bucket process 10 either has the old or updated bucket copy. This means that at any point, if the system were to restart, the data would be completely consistent.

As presented, at no point there is no bucket lock used in the process and there is achieved uninterrupted read while bucket process 10 simultaneously updates the same bucket. The system achieves a transaction which protects the read-modify operation at a low cost: 2 members stating head and spare on non-volatile memory. Compare to traditional bucket journaling (e.g., N×4K) which is a redundant additional full-page update (typically used only in failure). The spare slot is generally insignificant as well, assuming the logical tier will consist of many buckets (just 1 spare regardless of number of buckets).

In some implementations, the plurality of buckets may be updated 410 in a consecutive-cyclic manner. For example, updates may be in bucket consecutive order, since bucket updates the writes to the spare bucket, and the spare bucket location changes to the previous slot of the bucket that is updated. As described above, during bucket read we assume that buckets are stored in a cyclic and consecutive manner. Therefore, writing in non-consecutive order will result in breaking the invariant of the last point. For instance:
Original state:
  [bkt_3][bkt_4][spare_bkt][bkt_0][bkt_1][bkt_2]
  Head=3
  Spare=2
Update bucket 0:
  [bkt_3][bkt_4][updated_bkt_0][spare][bkt_1][bkt_2]
  Head=2
  Spare=3
Update bucket_2:
  [bkt_3][bkt_4][updated_bkt_0][updated_bkt_2][bkt_1][spare]
  Head=2
  Spare=5

If the system were to read buckets 1-2 using the algorithm described above, the wrong bucket would be read. As such, bucket process 10 may update the buckets in a consecutive-cyclic (e.g., ascending) manner, meaning the buckets are updated in the following example:
0, 1, 2 . . . , i+1, . . . , n−1, 0, 1 . . .

As mentioned above, the buckets being hardened represent buckets of a uniformly distributed hash table, meaning updates will be distributed evenly on average. This means that if the tier has n buckets and k updates, on average each bucket will have k/n new updates. Therefore, if bucket i and bucket j have no pending updates, and there were k new updates for a complete hash table, it may be assumed that buckets i,j have k/n updates each. If bucket i were updated by the hardening algorithm, and afterward there were x additional updated to the system, it may be known that on average bucket i has x/n pending updates, while bucket j has (k+x)/n new updates. Therefore, there is no need in updating bucket i again, prior to the update of bucket j. This statement it true to all other n−2 buckets. This means that prior to bucket i being updated again, all other buckets must be updated. Accordingly, this is why it is possible (and beneficial) to take a consecutive bucket update approach.

The plurality of buckets may be divided 412 between a fixed number of domains, wherein each domain of the fixed number of domains may be an instance of an independent logical tier, and wherein each domain of the fixed number of domains may include its own header and spare metadata member. For instance, the above-noted update algorithm may suffer from scaling issues, meaning it does not necessarily support two buckets being updated at the same time, due to the fact that it uses a single spare slot for the next bucket update. However, scaling may still be achieved by introducing domains.

For example, the n buckets may be divided equally between a fixed number (d) of domains. Each domain may consist of a collection of n/d consecutive buckets. Each domain may implement the logical tier described above and may be of size ((n/d)+1)*bucket_size. This means that each domain may in fact be an instance of an independent logical tier, which stores a group of buckets in a consecutive and cyclic manner, and therefore will have its own header and spare metadata members. Each domain may be updated as an independent unit, without any regard to other domains. For example:
2 domains, 6 buckets.
Domain 0: [bkt_0] [bkt_1] [bkt_2] [spare]
  Head: 0; Spare: 3.
Domain 1: [bkt_3] [bkt_4] [bkt_5] [spare]
  Head: 0; Spare: 3

Whereas domain 1 marks bkt_3 as its first bucket (as stated in head).

The fixed number of domains is the scaling upper-bound of the tier, and therefore it is possible to update as many as d buckets at the same time (since each domain can serve just one update at the same time). Bucket updates may be at a cyclic consecutive manner in a domain, and may be in a round-robin fashion between domains. For example,
2 domains, 6 buckets.
Original state:
  Domain 0: [bkt_0][bkt_1][bkt_2][spare]
  Head: 0; Spare: 3.
  Domain 1: [bkt_3][bkt_4][bkt_5][spare]
  Head: 0; Spare: 3
  Update bucket 0:
  Domain 0: [spare][bkt_1][bkt_2][updated_bkt_0]
  Head: 3; Spare: 0.
  Domain 1: [bkt_3][bkt_4][bkt_5][spare]
  Head: 0; Spare: 3
  Update buckets 1,3:
  Domain 0: [updated_bkt_1][spare][bkt_2][updated_bkt_0]
  Head: 3; Spare: 1.
  Domain 1: [spare][bkt_4][bkt_5][updated_bkt_3]
  Head: 3; Spare: 0
  Update bucket 4:
  Domain 0: [updated_bkt 1][bkt_2][bkt_2][updated_bkt_0]
  Head: 3; Spare: 1.
  Domain 1: [updated_bkt_4][spare][bkt_5][updated_bkt_3]
  Head: 3; Spare: 4.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
storing data in a bucket of a plurality of buckets, wherein the data in the bucket is stored in a consecutive-cyclic manner, wherein the bucket is assigned to a head index indicative of a location of the bucket;
reserving a spare bucket in the plurality of buckets, wherein the spare bucket is a next slot from the bucket;
storing a copy of the data in the spare bucket, wherein the spare bucket is assigned to a spare index indicative of a location of the spare bucket; and
updating a pointer to the data in the bucket and a pointer to the copy of the data in the spare bucket based upon, at least in part, storing the data in the bucket and storing the copy of the data in the spare bucket.

2. The computer-implemented method of claim 1 wherein updating the pointer to the copy of the data in the spare bucket includes pointing to the bucket storing the data.

3. The computer-implemented method of claim 1 further comprising updating the plurality of buckets in the consecutive-cyclic manner.

4. The computer-implemented method of claim 1 further comprising dividing the plurality of buckets between a fixed number of domains.

5. The computer-implemented method of claim 4 wherein each domain of the fixed number of domains is an instance of an independent logical tier.

6. The computer-implemented method of claim 4 wherein each domain of the fixed number of domains includes its own header and spare metadata member.

7. The computer-implemented method of claim 1 further comprising reading the bucket of the plurality of buckets, wherein reading the bucket of the plurality of buckets includes:

skipping one or more slots from a respective slot stated in the head index, and skipping one or more additional slots when a respective slot stated in the spare index is reached.

8. A computer program product residing on a non-transitory computer readable storage medium having a plurality of instructions stored thereon which, when executed across one or more processors, causes at least a portion of the one or more processors to perform operations comprising:

storing data in a bucket of a plurality of buckets, wherein the data in the bucket is stored in a consecutive-cyclic manner, wherein the bucket is assigned to a head index indicative of a location of the bucket;

reserving a spare bucket in the plurality of buckets, wherein the spare bucket is a next slot from the bucket;

storing a copy of the data in the spare bucket, wherein the spare bucket is assigned to a spare index indicative of a location of the spare bucket; and updating a pointer to the data in the bucket and a pointer to the copy of the data in the spare bucket based upon, at least in part, storing the data in the bucket and storing the copy of the data in the spare bucket.

9. The computer program product of claim 8 wherein updating the pointer to the copy of the data in the spare bucket includes pointing to the bucket storing the data.

10. The computer program product of claim 8 wherein the operations further comprise updating the plurality of buckets in the consecutive-cyclic manner.

11. The computer program product of claim 8 wherein the operations further comprise dividing the plurality of buckets between a fixed number of domains.

12. The computer program product of claim 11 wherein each domain of the fixed number of domains is an instance of an independent logical tier.

13. The computer program product of claim 11 wherein each domain of the fixed number of domains includes its own header and spare metadata member.

14. A computing system including:

one or more memories; and one or more processors configured to perform operations comprising:

storing data in a bucket of a plurality of buckets, wherein the data in the bucket is stored in a consecutive-cyclic manner, wherein the bucket is assigned to a head index indicative of a location of the bucket;

reserving a spare bucket in the plurality of buckets;

storing a copy of the data in the spare bucket, wherein the spare bucket is assigned to a spare index indicative of a location of the spare bucket; and updating a pointer to the data in the bucket and a pointer to the copy of the data in the spare bucket based upon, at least in part, storing the data in the bucket and storing the copy of the data in the spare bucket.

15. The computing system of claim 14 wherein updating the pointer to the copy of the data in the spare bucket includes pointing to the bucket storing the data.

16. The computing system of claim 14 wherein the operations further comprise updating the plurality of buckets in the consecutive-cyclic manner.

17. The computing system of claim 14 wherein the operations further comprise dividing the plurality of buckets between a fixed number of domains.

18. The computing system of claim 17 wherein each domain of the fixed number of domains is an instance of an independent logical tier, and wherein each domain of the fixed number of domains includes its own header and spare metadata member.

* * * * *